United States Patent [19]
Wegmann et al.

[11] 4,191,680

[45] Mar. 4, 1980

[54] PROCESS FOR THE MANUFACTURE OF CONCENTRATED FORMULATIONS

[75] Inventors: Jacques Wegmann, Bettingen; Hans D. Kirner, Pratteln, both of Switzerland

[73] Assignee: Rohner AG Pratteln, Pratteln, Switzerland

[21] Appl. No.: 923,655

[22] Filed: Jul. 11, 1978

[30] Foreign Application Priority Data

Jul. 11, 1977 [CH] Switzerland .......................... 8541/77

[51] Int. Cl.$^2$ ................................................ C08J 3/20
[52] U.S. Cl. ..................................... 260/42; 260/42.55
[58] Field of Search ............................... 260/42.55, 42

[56] References Cited

U.S. PATENT DOCUMENTS

| | | | |
|---|---|---|---|
| 3,449,284 | 6/1969 | Pollock | 260/42.55 |
| 3,769,257 | 10/1973 | Gridley et al. | 260/42.55 |

*Primary Examiner*—Sandra M. Person
*Attorney, Agent, or Firm*—Finnegan, Henderson, Farabow & Garrett

[57] ABSTRACT

Process for the manufacture of concentrated formulations which are in the form of free-flowing, low-dust powders or granules and are easily dispersible in aqueous and/or organic media, starting from active ingredients which are sparingly soluble or insoluble in water.

14 Claims, No Drawings

PROCESS FOR THE MANUFACTURE OF CONCENTRATED FORMULATIONS

The present invention relates to a process for the manufacture of concentrated formulations which are in the form of free-flowing, low-dust powders or granules and are easily dispersible in aqueous and/or organic media, starting from active ingredients which are sparingly soluble or insoluble in water, such as, for example, pigments, dyestuffs, optical brighteners, additives for plastics, textile auxiliaries, insecticides, pharmaceuticals, cosmetics and related substances, to the formulations manufactured in accordance with this process and to the use of the formulations for the manufacture of finely divided dispersions of the active ingredient or ingredients in aqueous or organic media.

The process according to the invention is a novel further development, associated with important advantages, of a process for the manufacture of easily dispersible formulations of dyestuffs or pigments, which is described, for example, in U.S. Pat. Nos. 3,923,452 and 3,844,606.

The process known, inter alia, from U.S. Pat. No. 3,923,452 essentially comprises combining a water-insoluble dyestuff or pigment, present in a very finely divided form in the organic phase of a two-phase system of water and an organic solvent of only limited miscibility with water, with a carrier resin which is also water-insoluble, and reducing the volume of the organic phase, by distilling off of solvent or by adding water, to the point where the resulting particles of the formulation can be separated off and freed from the residual water and solvent. According to U.S. Pat. No. 3,844,806 this process can also be carried out using water-soluble carrier resins, in which case the organic solvent must be removed by distillation.

For the known process to succeed, that is to say for the manufacture of formulations which can be redispersed satisfactorily and completely, it is important that the dyestuffs or pigments should be used in an extremely fine, regular and stable dispersion in the organic phase for combination with a carrier resin. For this purpose, the dyestuffs or pigments are best ground by means of sand or balls in water or in the organic solvent or in the two-phase system.

Since the combination of the finely disperse dyestuff or pigment with the carrier resin takes place in the organic phase of the two-phase system, it appears most obvious and safest to carry out the grinding and hence the dispersion of the dyestuff or pigment in the organic solvent, which has optionally first been saturated with water. This approach is indeed preferred in the examples of the abovementioned patent specifications.

However, numerous dyestuffs and pigments are obtained as aqueous filter cakes or press cakes and must therefore be dried before grinding, if they are to be ground in the organic solvent. Furthermore, grinding in an organic solvent, especially on an industrial production scale, entails a series of additional difficulties. Thus, closed mills must be used and if a circulatory process is used, closed apparatus must be employed. The regulations regarding protective measures, and the safety regulations, require that the shop floors should conform to higher standards. In addition, emptying and cleaning the equipment is more unpleasant when organic solvents are used. Furthermore, for grinding in organic media, soluble stabilisers and deflocculating agents, such as alkylated polyvinylpyrrolidones, polyureas or cellulose ethers, must be added. These necessarily remain in the formulations, which in many cases is undesirable. In the case of formulations which are to be dispersed in aqueous media it is even impossible to use stabilisers which are only soluble in organic media. Finally, various water-insoluble dyestuffs and pigments can be comminuted more easily and more rapidly in an aqueous medium by reprecipitation or by grinding than in an organic medium.

For the abovementioned reasons, the process described in the abovementioned patent specifications, which is also referred to as a "two-phase formulation process" has been developed further, so as to be able to employ more advantageous production conditions. For this purpose, the dyestuffs and pigments were ground in an aqueous medium. This further development is described and claimed in DOS No. 2,653,434.

It is true that a substantial advance, in particular in respect of the apparatus required, was achieved by grinding in an aqueous medium in accordance with the abovementioned DOS, but it did not prove possible to eliminate all the abovementioned disadvantages. Furthermore, the process is associated with additional difficulties, entailed by grinding in an aqueous medium, which do not occur in the case of grinding in the organic phase.

It is known that water-soluble dispersants must be used in order to prepare stable, concentrated and nevertheless still mobile dipersions in an aqueous medium. The most effective known water-soluble dispersants include condensation products of naphthalenesulphonic acids with formaldehyde, eg. the branded product Tamol ® NNOK (BASF, Rohm & Haas) as well as non-ionic condensation products of ethylene oxide with phenols or fatty alcohols, and mixtures of condensation products of naphthalenesulphonic acids with formaldehyde and non-ionic condensation products of ethylene oxide with phenols or fatty alcohols. However, aqueous dispersions prepared using these dispersants are frequently thixotropic, in particular if they contain only small amounts, namely less than 5% by weight, of dispersants. This means that such dispersions only remain mobile as long as they are stirred vigorously. This condition is admittedly fulfilled in the mills and treatment vessels used in production installations, but not in the pipelines, for example between the mills and the treatment vessels. Hence, these dispersions solidify in the pipelines to give a thick paste, causing blockages which are difficult to overcome. These blockages can only be overcome by an undesirable substantial reduction in the concentration of the dispersions or by increasing the concentration of dispersant used for grinding. However, increasing the dispersant concentration in turn causes undesirable difficulties. For example, it becomes very difficult or, under certain circumstances, even entirely impossible to form the two-phase system, in which the combination of the finely divided dyestuff or pigment with the carrier resin is to take place, from the aqueous medium and the organic solvent. The transfer of the finely divided dyestuff or pigment into the organic phase of the two-phase system, also referred to as the flushing process, also takes place incompletely at a high dispersant concentration. In order that the flushing process shall take place completely, it is necessary to employ special auxiliaries, which may have an adverse effect on the quality of the dyestuff or pigment dispersion. As a rule, furthermore, substantial amounts of the dyestuff or pigment are obtained in the aqueous phase, which has a high dispersant content, as a result of which the dyestuff or pigment content of the formulations is reduced. Furthermore, the dyestuffs or pigments retained in the aqueous phase may precipitate during isolation of the formulations, whereby the complete redispersibility of the formulations is impaired.

As an additional problem which occurs on grinding in an aqueous phase in accordance with the abovementioned DOS, mention should be made of the fact that whilst, as mentioned above, it is true that numerous dyestuffs and pigments can be ground better in an aqueous medium than in an organic medium, there are however just as many important dyestuffs and pigments which cannot be ground at all in an aqueous medium or can only be ground in the presence of such large amounts of dispersant that the formation of the two-phase system, which is absolutely essential for the process, is no longer possible at all. Hence, such dyestuffs or pigments can only be processed with great difficulty, if at all, by the process of the abovementioned DOS. These pigments which can only be processed with very great difficulty, if at all, include, for example, chlorinated copper phthalocyanines as well as various types of carbon black.

It has now been found that all the abovementioned disadvantages associated with grinding in an aqueous medium can, surprisingly, be eliminated completely without losing the advantages of grinding in an aqueous medium if the grinding of active ingredients, especially water-insoluble dyestuffs, pigments or water-insoluble optical brighteners, is carried out using certain grinding auxiliaries. As grinding auxiliaries, it is not possible to use the conventional dispersants, but only salts of acid resins, ie. polymers having acid groups such as carboxyl groups and sulpho groups, the salts being present in the dissolved form. Particularly preferred materials are water-soluble salts of water-insoluble synthetic resins which are derived from maleic acid or fumaric acid or their derivatives, such as esters, half-esters and anhydrides of maleic acid, of monoalkylmaleic and dialkylmaleic acids, of fumaric acid and of monoalkylfurmaric and dialkylfumaric acids, in particular alkali metal salts or ammonium salts of condensation products of maleic acid with a resin acid and at least one polyhydric alcohol, or alkali metal salts or ammonium salts of copolymers of maleic acid with at least one olefinically unsaturated compound. Further, it has been found that this process is not only suitable for water-insoluble dyestuffs, pigments and water-insoluble optical brighteners, but also for other active ingredients which are sparingly soluble or insoluble in water and which are preferably dispersed in an aqueous medium, such as, for example, naphthols, colour bases and other dyestuff intermediates, as well as for textile auxiliaries, additives for plastics, herbicides, insecticides, pharmaceuticals, cosmetics and related chemicals. Finally, it has also been found that the comminution of the active ingredients can be carried out not only by grinding, that is to say mechanically, but also chemically, for example by reprecipitation, or by a combination of mechanical and chemical comminution.

Accordingly, the process according to the invention is characterised in that at least one sparingly water-soluble or water-insoluble active ingredient is comminuted mechanically and/or chemically, in an aqueous medium, in the presence of a salt of an acid resin, present in the dissolved form, as a grinding auxiliary, until a mean particle size of less than 5 $\mu$m is reached, during or after comminution at least one organic solvent which has a limited solubility, of at least 1%, in the aqueous medium, and forms a two-phase system with the aqueous medium, is added, the resulting two-phase system is treated with at least one sparingly water-soluble, or water-insoluble, high-molecular carrier substance whilst undergoing turbulent mixing, the volume of the organic phase, which contains the carrier substance or substances and the active ingredient or ingredients is reduced, by adding further water, to the point that the resulting particles of the formulation are no longer tacky and can easily be separated off, and the particles are separated off, rinsed with water and dried, if required, in order to remove the solvent-containing aqueous phase.

As stated, the active ingredient or ingredients should be sparingly soluble or insoluble in water at room temperature. However, active ingredients which are not organophilic, such as, for example, titanium dioxide, are not suitable for the process according to the invention because they do not transfer into the organic phase during the turbulent mixing of the two phase system. Such active ingredients can be rendered organophilic by, for example, coating with synthetic resins.

When using pigment powders which are difficult to wet, and/or are bulky, as the active ingredient it may be advantageous additionally to admix, during comminution, non-ionic or anionic wetting agents and/or dispersants, such as, for example, alkylnaphthalenesulphonates, naphthylmethanedisulphonates and condensation products of ethylene oxide and propylene oxide with one another or with amines, phenols or higher alcohols, especially fatty alcohols. These wetting agents and/or dispersants can be used in amounts of from 0.5 to 5% by weight, based on the active ingredient or ingredients to be ground.

The process according to the invention thus comprises three essential and characteristic steps: (1) the comminution of the active ingredient or ingredients in an aqueous medium in the presence of the grinding auxiliary useable according to the invention, (2) the combination of the comminuted active ingredient or ingredients with the carrier or carriers in the organic phase of the two-phase system and (3) the isolation of the formulation by reducing the volume of the organic phase by adding water, during which the solvent progressively transfers into the added water.

According to the invention, the grinding auxiliaries used are readily water-soluble salts of acid resins. Examples of such salts are the alkali metal salts, but especially the ammonium salts, of the acid resins, and the salts of low molecular, water-soluble amines, such as ethylamine, diethanolamine, dimethylcyclohexylamine or morpholine, with the acid resins. Suitable acid resins which in the form of the free acid are water-insoluble are above all resin acids and their derivatives, having a molecular weight greater than 500. Numerous such acid resins are described, for example, in "Karstens Lack-rohstoff-Tabellen" ("Karstens Tables of Surface-coating Raw Materials"), 6th edition, C. R. Vincentz, Hannover 1976. Resin acids with excessively high molecular weights, such as, for example, above 50,000, are less suitable since grinding auxiliaries of this type have too high an intrinsic viscosity, so that the mixture of the active ingredient or ingredients to be comminuted, grinding auxiliaries and aqueous medium is excessively viscous. It is advantageous to use resin acids with molecular weights of between 1,000 and 10,000. For example, particularly suitable materials are water-soluble salts of copolymers or condensation products of maleic acid or of maleic acid derivatives, which salts may be present in amounts of from 0.5 to 20% by weight, preferably from 1 to 20% by weight, relative to the active ingredient or ingredients, during the comminution, in particular alkali metal salts or ammonium salts of copolymers of maleic acid or maleic acid derivatives with olefinically unsaturated, preferably low-molecular, compounds, such as ethylene, propylene, butylene, diisobutylene, vinyl esters, vinyl ethers, vinyl chloride or styrene, or alkali metal salts or ammonium salts of (preferably alcohol-soluble) condensation products of maleic acid or maleic acid derivatives with resin acids and polyhydric alcohols, for example mixed esters of abietic acid, maleic anhydride and pentaerythritol. These copolymers or condensation products preferably have a molecular weight of from 500 to 20,000 and an acid number of at least 100. Acid resins of this type include the branded product Alresat ® (Reichhold-Albert) and Pentalyn ® (Hercules).

The comminution is as a rule carried out at an active ingredient concentration of from 20 to 60% by weight, relative to the aqueous medium, by wet grinding using sand, balls or mills. Chemical comminution, for example by reprecipitation, is particularly suitable for alkalisoluble active ingredients. These may, for example, be dissolved, at a high concentration, in aqueous alkalis which contain a grinding auxiliary usable according to the invention, and be precipitated by means of acid before or after the formation of the two-phase system by addition of a suitable organic solvent. Admittedly, as mentioned, this embodiment is only suitable for alkalisoluble active ingredients and has the further disadvantage that the acid resin, of which the water-soluble salt was used as the grinding auxiliary, is also precipitated and remains in the formulation. This effect is not always desirable and does not occur on grinding in the presence of the grinding auxiliary.

The concentration of the grinding auxiliary during comminution can vary within wide limits. It is best to use a concentration which causes optimum reduction of the viscosity of the mixture of active ingredient or ingredients to be comminuted, grinding auxiliary and aqueous medium, but the desired particle size of the active ingredient or ingredients should also be taken into account by carrying out preliminary experiments. This concentration depends not only on the desired particle size but also on the active ingredient or ingredients to be comminuted and is on average about 1 to 20% by weight based on the active ingredient or ingredients to be comminuted. It is true that larger amounts of the grinding auxiliary can be used but this grinding auxiliary is lost if it is not intended to serve, at the same time, as a carrier; in the latter case, it is precipitated with acid after the comminution and is transferred (flushed) into the organic phase.

During comminution, the aqueous phase can already contain a certain amount of the organic solvent, for example be saturated therewith, in addition to the grinding auxiliary. This formation of the second phase by adding (further) solvent is however advantageously only effected after termination of the comminution and, where appropriate, after filtration of the aqueous dispersion obtained on comminution. The volume of the organic phase is preferably sufficiently large that the organic phase can hold the active ingredient or ingredients and carrier or carriers in a state of optimum distribution and at the same time remains liquid to pasty, so that mixing the active ingredient or ingredients and carrier or carriers, by stirring or shaking, is possible without difficulties. As a rule, this condition is fulfilled if the volume of the organic phase and the total volume of active ingredient or ingredients plus carrier or carriers are equal. If it is found that insufficient organic solvent is present, further organic solvent can easily be added. If too much organic solvent is present, it admittedly does not interfere with the success of the process, but is uneconomical.

The carrier or carriers can be stirred in after conclusion of the comminution, before or after the addition of the solvent for the purpose of forming the second phase, or can be dissolved or dispersed in the organic solvent to be added. However it is undesirable that the carrier or carriers should already be present in the aqueous medium during the comminution, since this slows down the comminution and interferes with filtration of the dispersion, if appropriate after removing the grinding bodies used.

When the active ingredient or ingredients and carrier or carriers have been completely removed from the aqueous phase by turbulent mixing, the organic phase which contains the active ingredient or ingredients and carrier or carriers has been homogenised and the aqueous phase has separated as a clear phase from the organic phase, it is possible to start adding further water in order to reduce the volume of the organic phase. This process can be assisted by stirring or shaking. The intensity of stirring or shaking depends on how easily the solvent transfers from the particles of the formulation into the aqueous phase and on whether the formulation is to be isolated in the form of relatively coarse granules or of a powder with very fine particles. As a rule, formulations having a particle size of about 100 to 200 μm are particularly advantageous. If, after substantially reducing the volume of the organic phase, the mixture is stirred or shaken too vigorously, the resulting formulation may under certain circumstances have too high a content of material of fine particle size. This makes it difficult to isolate the formulation. Furthermore, such formulations tend to cause dust if the fine constituent is not removed by sieving. The greater the difference between the solvent concentration in the organic phase and the solvent concentration in the aqueous phase, the more rapidly does the organic solvent transfer into the aqueous phase. Vigorous stirring or shaking is not as suitable for accelerating the reduction in volume of the organic phase as is separating off the aqueous phase, for example by decanting or siphoning, and stirring or shaking the separated-off organic phase with fresh water. The last remnants of solvent can best be removed by washing the formulation with water on the suction filter or in the filter press. Under no circumstances should the formulation already be filtered off whilst it still contains so much solvent that its particles are still soft and stick together when separated off, for example on the suction filter. The particles of the formulation can only be separated off when they have hardened, and been freed from solvent, to a sufficient extent that they retain their shape unchanged. They can be dried in accordance with customary processes, preferably in vacuo.

Using the process according to the invention, the active ingredients can be converted to formulations which can be dispersed easily both in an aqueous and in an organic medium. Examples of active ingredients which as a rule are used as dispersions in an aqueous medium are herbicides, insecticides, cosmetics, pharmaceuticals and textile auxiliaries. Examples of active ingredients which are used in dispersion in both aqueous and organic media are additives for plastics, optical brighteners and dyestuff intermediates, but especially dyestuffs and pigments.

Examples of dyestuff intermediates are acetoacetic acid arylides, arylides of aromatic o-hydroxycarboxylic acids, pyrazolones, aminopyrazoles and aromatic amines.

Suitable dyestuffs are above all disperse dyestuffs and vat dyestuffs which are free from water-soluble dispersants and from extenders. They can have a great variety of constituents. For example, disperse dyestuffs may be naphthoquinone derivatives, anthraquinone derivatives, azo dyestuffs, heterocyclic compounds, for example quinophthalones, thiazolanthrones, anthrapyrimidines or naphthalimides, as well as stilbene dyestuffs or nitro dyestuffs. Examples of vat dyestuffs are indigoid, thioindigoid or anthraquinonoid dyestuffs, as well as various polycyclic and heterocyclic compounds, such as anthanthrone, dibenzanthrone, flavanthrone and indanthrone.

Examples of pigments are inorganic pigments, such as carbon black and metal oxides, as well as organic pigments mentioned, for example, in "Farbe und Lack" 80, 1044 to 1053 (1974). Particularly important pigments are naphthol pigments and heterocyclic compounds, such as quinacridones, perylene-imides and phthalocyanines.

Organic solvents which may be used in the process according to the invention are all organic solvents which have a limited solubility, of at least 1%, in the aqueous medium and form a two-phase system with the aqueous medium. For economic reasons it is desirable that the solubility of the solvent in the aqueous medium should be as high as possible. On the other hand, a solubility greater than 50% is undesirable.

The solvents may be those which have a limited solubility of at least 1%, preferably of 10 to 50%, in water. Examples of such solvents are chlorinated hydrocarbons, such as methylene chloride, nitriles, such as acrylonitrile, nitroalkanes, such as nitromethane and nitroethane, aldehydes, such as furfuraldehyde, ethers, such as 2-phenoxyethanol, esters, such as ethyl acetate, ketones, such as methyl ethyl ketone or methoxyhexanone, alcohols, such as n-butanol, sec.-butanol and isobutanol, and also 2-ethoxyethyl acetate.

If the aqueous medium contains an electrolyte, for example sodium chloride, it is however also possible to use solvents which are miscible in all proportions with pure water but have a limited solubility of at least 1%, preferably of 10 to 50%, in water containing electrolyte. Examples of such solvents are tert.-butanol, 2-methoxyethyl acetate, ethylene carbonate, acetonylacetone, hydroxyacetone and diacetone-alcohol.

Preferred solvents are alcohols, ethers, esters and ketones. Mixtures of organic solvents, for example of those mentioned above, can also be used.

Suitable carriers are a great diversity of sparingly water-soluble or water-insoluble, high molecular organic compounds which may be of natural, semi-synthetic or fully synthetic origin. Preferably they are amorphous and thermoplastic and have a molecular weight of above 350, especially above 1,000. They may, under normal conditions, range from a liquid to a honey-like consistency as, for example, sucrose acetate; preferably, however, they are solid under normal conditions. Examples of such carriers are polyolefines, polyamides, polyurethanes, polyesters, polyvinyl compounds, polyacrylic compounds, copolymers of olefines, copolyamides, copolyurethanes, copolyesters, copolymers of vinyl compounds and acrylic compounds as well as esters and ethers of polysaccharides, especially esters and ethers of cellulose. Preferred carriers are esters and ethers of cellulose, polyvinyl acetal, vinyl chloride/vinyl acetate copolymers and modified resin acid derivatives. However, acid or basic synthetic resins which can easily and rapidly be converted to a water-soluble form by means of salts, acids or bases, such as alkalis or, in particular, water-soluble amines, may also be used as carriers. Formulations which contain such carriers can be used to prepare extremely finely divided stable dispersions in aqueous or aqueous-organic media. Particularly interesting carriers are derivatives of resin acids, such as abietic acid, and condensation products or copolymers of maleic acid and maleic acid derivatives, such as have been referred to above as acid resins, of which the water-soluble salts can be used as grinding auxiliaries. In the form of the water-insoluble free acids, they can be used as carriers; if their water-soluble salts are used as grinding auxiliaries, the free acid can also be precipitated from these salts in the two-phase system by adding acid and be transferred into the organic phase. Accordingly, the same acid resin can be used first in the form of a water-soluble salt as the grinding auxiliary and then in the form of the sparingly water-soluble or insoluble free acid as the carrier. As a rule, however, it is more advantageous only to add the greater part of the carrier after the comminution process. However, the preferred molecular weight, specified above for the grinding auxiliaries, of 500 to 20,000, especially 1,000 to 10,000, does not apply to the carrier. High molecular compounds can also be used as the carrier and are as a rule even particularly suitable. The higher-molecular acid resins can be combined with lower-molecular acid resins, the water-soluble salts of which are particularly preferred grinding auxiliaries. The grinding auxiliaries are preferably precipitated as free acids, and transferred into the organic phase, by adding acid after the formation of the two-phase system.

The formulation prepared according to the invention as a rule contain from 20 to 95% by weight, preferably from 50 to 80% by weight, of the finely dispersed active ingredient or ingredients and from 5 to 80% by weight, preferably from 20 to 50% by weight, of the carrier or carriers, which is or are preferably soluble in the medium in which the formulations are used or can easily be converted into a form which is soluble in the medium in which the formulations are used. The upper limit of the active ingredient content depends on the dispersibility of the active ingredient, and a certain margin of safety may be applied with a view to the reproducibility of the dispersion process. Excessively high carrier contents are uneconomical and may interfere. As has been stated, the formulations manufactured according to the invention are free-flowing, low-dust powders or granules which are easily and completely dispersible in aqueous and/or organic media. It is above all their simple and complete, well-reproducible dispersibility in the use media which is very valuable from the point of view of reliable and economical operation. The stability and shelf life of the formulations is also important.

The formulations manufactured according to the invention can be used for a great diversity of purposes. For example, they can be stirred into an aqueous or organic medium, such as water or an organic solvent, in order to prepare a highly concentrated, very finely divided stock dispersion of the active ingredient or ingredients in the medium. This is above all of advantage if the medium contains water as well as solubilising agents for the carrier or carriers. Stable, highly concentrated stock dispersions of this type can be prepared, for example, from formulations which contain insecticides, herbicides, cosmetics, pharmaceuticals, dyestuff intermediates or optical brighteners as the active ingredient or ingredients, and facilitate the use of the latter. The preparation of such stock dispersions from formulations which contain dyestuffs or pigments as the active ingredient or ingredients and are intended for dyeing or printing textiles may also be of advantage. The stock dispersions can also contain auxiliaries, such as thickeners, crosslinking agents, catalysts and the like.

Formulations which contain additives for plastics as the active ingredient or ingredients, as well as dyestuff formulations and especially pigment formulations for colouring plastics or for printing sheet-like structures, such as paper and films, are best directly dispersed in the aqueous or organic medium, which as a rule is an organic medium, such as a solution or melt. It may be noted that printing inks usually have a composition which is such that they can be regarded as a type of stock dispersion. The formulations prepared according to the invention are very particularly suitable for the preparation of highly concentrated printing inks, since they contain a minimum of carrier or carriers and therefore have a minimum intrinsic viscosity, but can nevertheless be dispersed easily and completely without special technical effort. Whilst aqueous printing inks which contain disperse dyestuffs, intermediates or pigments can above all be used for conventional printing of textiles, paper or films, organic printing inks as a rule serve above all for printing paper and films, for example in order to produce transfers for the transfer printing process.

The examples which follow illustrate the invention. Parts and percentages are parts by weight and percentages by weight, unless stated otherwise.

EXAMPLE 1

100 parts of chlorinated copper phthalocyanine are slowly introduced into 100 parts of a solution of 5 parts of concentrated ammonia and 10 parts of a maleate resin (Alresat®KM 140 from Reichhold-Albert) in 135 parts of water and are milled in a mill containing 400 parts of zirconium oxide balls of diameter about 2 mm, until the particle size is essentially below 1 μm. After separating off and filtering the dispersion thus obtained, a solution of 50 parts of ethylcellulose in 400 parts of water-saturated sec.-butanol is added and the mixture is stirred vigorously until complete mixing has occurred. Water is then added, with continued stirring, until the organic phase begins to disintegrate into crumbly particles. The mixture is allowed to sediment, the supernatant aqueous phase is decanted off, and the residue is topped up with fresh water and stirred until the granule particles have a diameter of about 200 μm. Thereafter the formulation is filtered off, washed with water and dried in a vacuum cabinet at 60° C.

The formulation can be very easily dispersed in paper printing inks which contain alcohols or ketones as solvents and cellulose ethers or cellulose esters as thickeners.

Instead of Alresat®KM 140, Alresat®KM 118, KM 400 or KM 440 (Reichhold-Albert), Hercules Resin®B 106 (Hercules), Pentalyn®255 or Pentalyn®261 (Hercules) or an SMA resin (ARCO Chemical Company) can be used with comparably good success for the preparation of the grinding auxiliaries. Instead of ammonia, equivalent amounts of ethylamine, morpholine, diethanolamine or dimethylcyclohexylamine can also be used.

Comparably good formulations are also obtained if instead of ethylcellulose, ethylhydroxyethylcellulose, ethanol-soluble acetylcellulose, cellulose acetobutyrate or cellulose acetopropionate is used as the carrier.

If α- or β-copper phthalocyanine is used instead of the pigment used above, comparably good formulations are obtained.

If, during grinding, 1 to 5 parts of isopropylnaphthalenesulphonate, dinaphthylmethanedisulphonate or a condensation product of 16 mols of ethylene oxide with 1 mol of a mixture of oleyl alcohol and stearyl alcohol is added, the stirring-in of the bulky, finely pulverulent pigment is greatly facilitated and the escape of air from the mixture of pigment, grinding auxiliary and aqueous medium is assisted. This measure is quite generally advisable in the case of active ingredients which are difficult to wet and are bulky.

EXAMPLE 2

30 parts of carbon black (Printex®A/G from Degussa) are slowly introduced into 70 parts of a 5% strength ammoniacal solution of a maleate resin (Hercules Resin® B 106) and milled with 200 parts of glass balls until the particle size is 1 μm or less. Thereafter the grinding bodies are removed, the mixture is covered with a dispersion of 20 parts of polyacrylonitrile powder in 80 parts of 4-methoxy-4-methyl-2-pentanone, the batch is stirred vigorously until completely mixed and is then diluted slowly with water until the formulation disintegrates into fine granules, these are allowed to sediment, the supernatant aqueous phase is decanted, the remainder is topped up with fresh water and left to stand for some time, and the formulation is filtered off, washed and dried.

The formulation obtained is very suitable for the mass colouring of polyacrylonitrile from a dispersion in dimethylformamide.

Instead of 4-methoxy-4-methyl-2-pentanone, methyl ethyl ketone, acetonylacetone or cyclohexanone can also be used as the organic solvent.

If instead of polyacrylontrile powder, a polyethylene, polypropylene, polyamide or polyethylene terephthalate powder is used as the carrier and in other respects the procedure described is followed, formulations are obtained which are very suitable for the mass colouring of fibres of the resins used as carriers.

Instead of the abovementioned carbon black pigment, it is also possible to use other carbon black pigments, such as Printex®300 (Degussa), Philblack 0 or Raven 1200. Pigment Brown 2R gives a very good brown formulation, flavanthrone gives a very good yellow formulation and Cromophthalscharlach®R (Ciba-Geigy) gives a very good red formulation, the formulations having very good dispersibility and high tinctorial strength, brilliance and transparency.

EXAMPLE 3

75 parts of β-copper phthalocyanine are ground in 50 parts of a 5% strength ammoniacal solution of Alresat ® KM 140 (Reichhold-Albert) by means of 200 parts of glass balls of 2 mm diameter until the average particle size is less than 1 μm. After separating off the grinding bodies, the mixture is covered with a dispersion of 40 parts of a copolymer of vinyl chloride and vinyl acetate in 100 parts of 2-ethoxyethyl acetate, the batch is homogenised by means of a toothed disc stirrer and is diluted slowly with water, whilst being stirred more gently, until granulation occurs, the aqueous phase is decanted, the residue is topped up with fresh water and left to stand for some time, and the formulation is filtered off, washed with water and dried.

The formulation obtained is outstandingly suitable for the mass colouring of polyvinyl chloride fibres, as well as for pigmenting acrylic resin lacquers. Comparably good formulations are also obtained with the pigments mentioned in Examples 1 and 2.

EXAMPLE 4

50 parts of Colour Index (C.I.) Pigment Yellow 111 are ground in 50 parts of a 5% strength ammoniacal solution of Alresat ® KM 140 (Reichhold-Albert), using 200 parts of zirconium oxide balls, until the particle size reaches about 1 μm; after separating off the grinding bodies, the mixture is covered with 100 parts of a suspension of 25 parts of a polyvinylbutyral (Mowital ® B30H from Hoechst) in 100 parts of isobutanol. The batch is homogenised in a domestic mixer (Turmix ®) having a rotating ring of knives and is then diluted slowly with water until granulation starts, the aqueous phase is siphoned off and replaced by fresh water, the mixture is stirred until the desired granule size is reached and the formulation is filtered off, washed with water and dried.

The formulation obtained is suitable for printing paper with printing inks which contain polyvinylbutyral or cellulose esters or ethers.

Comparably good formulations are also obtained if instead of Mowital ® B30H an equal amount of ethanol-soluble cellulose acetobutyrate or ethylcellulose is used as the carrier and in other respects the procedure described above is followed.

EXAMPLE 5

50 parts of Permanent Yellow HR (Hoechst) are mixed with 50 parts of a 10% strength aqueous-ammoniacal solution of Alresat ® KM 140 (Reichhold-Albert) and ground to a particle size of about 1 μm by means of 200 parts of zirconium oxide balls. After removing the balls, the dispersion is covered with 100 parts of a 10% strength solution of a styrene/maleate resin having a molecular weight greater than 30,000 (SMAC A from Van Baerle) in methyl ethyl ketone, and is neutralised and slowly diluted with water until granulation occurs. The aqueous phase is replaced by fresh water, the mixture is left to stand for some time and the formulation is filtered off, washed and dried.

The resulting formulation can be dispersed easily and completely in aqueous alkaline solution and can be used in this form for pigmenting paper or emulsion paints, or for the mass colouring of regenerated cellulose fibres.

Comparably good formulations are also obtained with other pigments, for example those mentioned in the preceding examples.

EXAMPLE 6

50 parts of 1-amino-2-chloro-4-hydroxyanthraquinone are ground in 50 parts of a 2% strength ammoniacal solution of Hercules Resin ® B 106 (Hercules) until an average particle size of less than 5 μm is reached. The mixture is covered with a solution of 5 parts of ethylcellulose in 100 parts of water-saturated sec.-butanol and is homogenised with a toothed disc stirrer and gradually diluted with water until granulation has been completed. After decanting the aqueous phase and washing the residue with fresh water, the formulation is filtered off, washed and dried. The resulting formulation can be dispersed easily and completely in printing inks which contain alsohols or ketones as the organic solvent and ethylcellulose as the thickener. If paper is printed with such printing inks, transfers for heat transfer printing, especially onto polyamide fibres, are obtained.

If instead of ethylcellulose, Mowital ® B 30H (Hoechst) or ethanol-soluble cellulose acetopropionate or cellulose acetobutyrate is used as the carrier, formulations with comparably good use properties are obtained.

If Hercules Resin ® B 106 (Hercules) is used as the carrier resin, the resulting formulation can be employed both in water-based printing inks and in organic-based printing inks. In the former case, the addition of bases, such as alkalis and especially ammonia, is necessary during dispersion.

If instead of the abovementioned dyestuff other transferable disperse dyestuffs are used and in other respects the procedure indicated is followed, comparably good formulations are obtained.

EXAMPLE 7

50 parts of the azo dyestuff obtained from nitrotoluidine and β-naphthol are ground in 50 parts of a 5% strength solution of Alresat ® KM 140 (Reichhold-Albert) in aqueous ammonia by means of 200 parts of glass beads until the particle size has reached less than 5 μm. After separating off the grinding bodies, and neutralising the mixture, the dispersion is covered with a suspension of 10 parts of SMAC A (van Baerle) in 90 parts of methyl ethyl ketone and the batch is homogenised. It is then diluted slowly with water and stirred until granulation has been completed. On decanting the aqueous phase and washing, filtering off and drying the granules, a formulation is obtained which can be dispersed easily and completely in an aqueous medium, if ammonia is added, and can be thickened with hydroxyethylcellulose for the purpose of printing paper or textiles or dyeing textiles from an aqueous bath.

EXAMPLE 8

40 parts of chlorinated indanthrone are ground in 60 parts of a 5% strength solution of Alresat ® KM 140 (Reichhold-Albert) in aqueous ammonia, using 200 parts of zirconium oxide balls, until the particle size is from 1 to 2 μm. After separating off the grinding bodies, the mixture is covered with a solution of 10 parts of SMAC A (van Baerle) in 100 parts of methyl ethyl ketone and the batch is homogenised with a toothed disc stirrer and then diluted with water until granulation has been completed. The aqueous phase is decanted, fresh water is added, the mixture is left to stand for some time and the formulation is filtered off and dried.

The resulting formulation can easily be dispersed if ammonia is added and can be used for dyeing or printing cellulose textiles in accordance with known processes.

If instead of the vat dyestuff mentioned, other products which do not contain an extender are used, for example C.I. Vat Orange 11, comparably good formulations are obtained.

EXAMPLE 9

40 parts of the chromium complex of the azo dyestuff obtained from nitroaminophenol and β-naphthol are ground in 60 parts of a 5% strength solution of Alresat® KM 140 (Reichhold-Albert) in aqueous ammonia, by means of 200 parts of quartz sand, until a particle size of 2 μm is reached. After separating off the sand, 10 parts of sodium chloride are added, the mixture is covered with a suspension of 20 parts of magnesium behenate in 100 parts of tert.-butanol and the batch is homogenised. It is then diluted with water until granulation occurs, the aqueous phase is decanted and the granules are washed, filtered and dried. The formulation is readily dispersible and is suitable for pigmenting polyolefines or polyamides. Instead of tert.-butanol, ethylene carbonate, propylene carbonate or diacetone-alcohol can also be used, with comparable success.

EXAMPLE 10

30 parts of 2,5-(benzoxazolyl)-2'-thiophene are ground in 70 parts of a 10% strength solution of Hercules Resin® B 106 (Hercules) in aqueous ammonia, using 200 parts of glass beads, until a particle size of about 1 μm is reached. After separating off the grinding bodies, the mixture is covered with a solution of 13 parts of Hercules Resin® B 106 in 100 parts of sec.-butanol, the batch is neutralised, homogenised and diluted with water until granulation is complete, the aqueous phase is decanted, the granules are washed and the formulation is filtered off and dried.

The formulation can easily be dispersed in an aqueous medium if alkalis are added. It can be used for brightening textiles, especially those made from polyamide fibres.

EXAMPLE 11

50 parts of C.I. Azoic Coupling Component 2 are dispersed in 50 parts of a 2% strength solution of Alresat® KM 140 (Reichhold-Albert) in aqueous ammonia. The dispersion is then covered with a solution of 4 parts of Alresat® KM 444 in 100 parts of tert.-butanol, the batch is homogenised in a mixer, neutralised and diluted with water until granulation is complete, the aqueous phase is decanted and the granules are washed, filtered off and dried.

The resulting formulation is non-dusting and free-flowing, and can easily be dissolved in an aqueous alkaline medium.

EXAMPLE 12

50 parts of the dyestuff obtained by coupling o-anisidine with Naphthanilide CR® (Rohner) are added slowly, in portions, to a solution of 5 parts of a 20% strength ammoniacal solution of SMA 1440 (Alcoa Chemical Company), 0.5 part of Marlipal® 1618/25 (Huls) and 0.2 part of isopropylnaphthalenesulphonate in 45 parts of water, in a stirred ball mill containing 200 parts of zirconium oxide balls of 1 to 2 mm diameter. The mixture is ground until an average particle size of 1 μm is obtained and the balls are then filtered off. 10 parts of a styrene/maleate resin (SMAC A from van Baerle) are dissolved in 80 parts of methyl ethyl ketone. This solution is added to the dyestuff dispersion and the mixture is shaken or stirred until the finely divided dyestuff has been flushed into the organic phase and the aqueous phase only retains a pale red colour. A total of 500 parts of water is then added slowly, whilst stirring or shaking. After addition of only 50 parts of water the organic phase already disintegrates into fine granules. The granules are filtered off, washed and dried. An 80% strength formulation is obtained, which can be dispersed in an aqueous ammoniacal solution to give a fine stable dispersion.

If the SMA 1440 is replaced by a corresponding amount of Alresat® KM 140 (Reichhold-Albert) or the Marlipal® is replaced by Neolan®—Salt P (Ciba-Geigy) or Invadin® IFC (Ciba-Geigy), and in other respects the procedure described is followed, a comparably good result is obtained.

If instead of the abovementioned dyestuff, a mixture of two dyestuffs, formed by coupling o- and p-ethylaniline with 2,3-hydroxynaphthoic acid 2',5'-dimethoxyanilide, is used and in other respects the procedure described above is followed, a comparably good formulation is obtained. Equally good results are obtained if the dyestuff obtained by coupling methyl anthranilate with 2,3-hydroxynaphthoic acid p-phenetidide in the presence of 1% of polytetrafluoroethylene is used.

We claim:

1. A process for the manufacture of aqueous and/or organic dispersible, free-flowing, and low-dusting concentrated formulations in powder or granular form of at least one ingredient which is sparingly soluble or insoluble in water, comprising the steps of:
    (i) mechanically and/or chemically comminuting said ingredient in an aqueous medium, in the presence of a grinding auxiliary comprising a dissolved, water soluble salt of an acid resin, until a mean particle size of less than 5 μm is reached;
    (ii) forming a two-phase system with said aqueous medium by adding, during or after comminution, at least one organic solvent which has a limited solubility, of at least 1% to 50%, in the aqueous medium;
    (iii) turbulently mixing the resulting two-phase system with at least one sparingly water-soluble, or water-insoluble, high-molecular carrier;
    (iv) reducing the volume of the organic phase, said organic phase containing said carrier and said ingredient by adding further water, until the formulation particles formed are no longer tacky;
    (v) separating off said formulation particles; and
    (vi) rinsing off with water said separated particles.

2. The process according to claim 1, wherein said ingredient comprises at least one member selected from the group consisting of water-insoluble dyestuffs, water-insoluble optical brighteners, and pigments.

3. The process according to claim 1 or 2, wherein said grinding auxiliary comprises from 0.5 to 20% by weight, relative to said ingredient of at least one dissolved water-soluble salt selected from the group consisting of a copolymer of maleic acid, a condensation product of maleic acid and a maleic acid derivative.

4. The process according to claim 1 wherein said grinding auxiliary is at least one alkali metal salt or ammonium salt of a member selected from the group consisting of (i) a condensation product of maleic acid with a resin acid and at least one polyhydric alcohol, and (ii) a copolymer of maleic acid with at least one olefinically unsaturated compound, and wherein said comminuting step further includes the presence of at most 5% by weight, relative to said ingredient of at least one member selected from the group consisting of an anionic dispersant, a non-ionic dispersant an anionic wetting agent, and a non-ionic wetting agent.

5. The process according to claim 1 wherein the concentration of said ingredient is from 20 to 60% by weight, relative to the aqueous medium, and wherein said comminuting is accomplished by wet grinding means including sand, balls or mills.

6. The process according to claim 1 wherein said organic solvent is at least one member selected from the group consisting of an alcohol, a ketone, an aldehyde, an ester, an ether, a nitrile and a nitroalkane and wherein said solvent has a solubility in water of from 10 to 50%.

7. The process according to claim 1 wherein said aqueous medium contains an electrolyte and wherein said organic solvent is miscible with pure water in all proportions but has a limited solubility of at least 1%, in said aqueous medium containing said electrolyte.

8. The process according to claim 1 wherein said carrier is at least one member selected from the group consisting of an ester of cellulose an ether of cellulose, a polyvinyl acetal, a polyolefine, a polyamide, a polyurethane, a polyester, a polyacrylic compound, a polyvinyl compound, and an acid or basic synthetic resin which can be converted to a water-soluble form.

9. A formulation, in the form of an aqueous and/or organic dispersible, free-flowing, low-dust powder, which has been manufactured by the process according to claim 1.

10. The formulation according to claim 9, wherein said formulation contains from 20 to 90% by weight of said ingredient.

11. Use of a formulation according to claim 9 or 10 for the manufacture of a finely divided dispersion of the ingredient in an aqueous or organic medium.

12. The process of claim 1 further including the step of drying said rinsed particles.

13. The process of claim 3 wherein said grinding auxiliary comprises from 1 to 20% by weight relative to said ingredient.

14. The process of claim 7 wherein said organic solvent has a solubility of 10 to 50% in said aqueous medium containing said electrolyte.

* * * * *